United States Patent
Urabl et al.

(10) Patent No.: US 12,275,181 B2
(45) Date of Patent: Apr. 15, 2025

(54) BLOW MOLD, STRETCH BLOW MOLDER AND METHOD FOR FORMING A CONTAINER

(71) Applicant: ALPLA Werke Alwin Lehner GmbH & Co. KG, Hard (AT)

(72) Inventors: Stephan Urabl, Höchst (AT); Dmitry Sokolov, Bovenden (DE); Adem Demir, Lauterach (AT)

(73) Assignee: ALPLA Werke Alwin Lehner GmbH &Co. KG, Hard (AT)

( * ) Notice: Subject to any disclaimer, the term of this patent is extended or adjusted under 35 U.S.C. 154(b) by 234 days.

(21) Appl. No.: 17/782,343

(22) PCT Filed: Nov. 30, 2020

(86) PCT No.: PCT/EP2020/083928
§ 371 (c)(1),
(2) Date: Jun. 3, 2022

(87) PCT Pub. No.: WO2021/110594
PCT Pub. Date: Jun. 10, 2021

(65) Prior Publication Data
US 2023/0038767 A1 Feb. 9, 2023

(30) Foreign Application Priority Data

Dec. 5, 2019 (CH) ...................... 1550/19

(51) Int. Cl.
| | | |
|---|---|---|
| B29C 49/48 | (2006.01) | |
| B29K 667/00 | (2006.01) | |
| B29L 31/00 | (2006.01) | |

(52) U.S. Cl.
CPC .. B29C 49/4802 (2013.01); *B29C 2049/4807* (2013.01); *B29C 2049/4889* (2013.01); *B29K 2667/003* (2013.01); *B29L 2031/7158* (2013.01)

(58) Field of Classification Search
CPC ........ B29C 49/4802; B29C 2049/4889; B29C 2049/4807; B29C 2049/7831;
(Continued)

(56) References Cited

U.S. PATENT DOCUMENTS

| | | |
|---|---|---|
| 5,035,604 A | 7/1991 | Rathman et al. |
| 5,044,923 A | 9/1991 | Przytulla |

(Continued)

FOREIGN PATENT DOCUMENTS

| | | |
|---|---|---|
| EP | 0 393 370 A2 | 10/1990 |
| GB | 882 790 | 11/1961 |

(Continued)

OTHER PUBLICATIONS

International Search Report Corresponding to PCT/EP2020/083928 mailed Jan. 28, 2021.

(Continued)

*Primary Examiner* — Monica A Huson
(74) *Attorney, Agent, or Firm* — Finch & Maloney PLLC (57) ABSTRACT

The invention relates to a blow mold (100) comprising a mold base (101) having a cavity (102) as the mold cavity, the cavity (102) having a bottom region (1), a center region (2) and a top region (3). When the blow mold (100) is closed, the center region (2) can be moved relative to the top region (1) and/or relative to the bottom region (3).

17 Claims, 5 Drawing Sheets

(58) Field of Classification Search
CPC ....... B29C 49/42396; B29L 2031/7158; B29K 2667/003
See application file for complete search history.

(56) References Cited

U.S. PATENT DOCUMENTS

| | | | |
|---|---|---|---|
| 5,202,078 A * | 4/1993 | Moore | B29C 49/4802 425/525 |
| 5,389,332 A | 2/1995 | Amari et al. | |
| 2018/0257264 A1 | 9/2018 | Kawamura et al. | |

FOREIGN PATENT DOCUMENTS

| | | |
|---|---|---|
| JP | S56-56830 A | 5/1981 |
| KR | 101 116 169 B1 | 3/2012 |

OTHER PUBLICATIONS

Written Opinion Corresponding to PCT/EP2020/083928 mailed Jan. 28, 2021.

* cited by examiner

BLOW MOLD, STRETCH BLOW MOLDER AND METHOD FOR FORMING A CONTAINER

The present invention relates to a blow mold, a stretch blow molder, and a method for forming a container according to the preamble of the independent claims.

Various methods and devices for forming a container are known from the prior art.

The production of hollow plastic containers typically takes place by so-called blow-molding methods. The most common blow-molding methods are extrusion blow-molding and stretch blow-molding. Both blow-molding methods have in common that the final mold of a hollow plastic body is given in a blow mold.

These two blow-molding methods differ in essential points.

The extrusion blow-molding method is characterized in that a hollow body is produced from a thermoplastic hose drawn in length. By contrast, in the stretch blowing process, hollow bodies are produced from a prefabricated hollow body—specifically, a preform—in that it is stretched in the circumferential direction and in the longitudinal direction. The plastic of the container is subsequently stretched biaxially.

In general, it can be said that a person skilled in the art would expect that a body inflated in a form, which is produced in an extrusion blow-molding method, can still be easily deformed immediately after inflation. In the case of a stretch blow-molded body, this is not necessarily expected, because a person skilled in the art knows that stretched plastic resists subsequent deformation.

In the case of containers produced in these blow-molding methods, the method by which they are produced can also be determined from the finished container.

Extrusion blow-molded containers have a crimp seam in or on the bottom. In the case of stretch blow-molded containers, only one injection point is visible on the bottom, which injection point is produced during the production of the preform. Containers that have been produced in the extrusion blow-molding method can also be recognized in that the inner contour substantially follows the outer contour. Thus, a thread formed in the extrusion blow-molding method on a bottleneck is discernible as a negative contour in the interior of the container. However, in the case of stretch blow-molded containers, an inner contour that deviates from the outer contour is present, in particular, in the region of the pour opening, which is typically produced by injection molding. Thereby, the outer contour can have a thread, for example, and the inner contour can have a smooth surface. This is necessary in order to demold the preform in the preceding injection-molding method.

A blow mold is typically formed from two mold halves, wherein the structure can also be of more than two parts. The blow mold has a mold base with a cavity and thus provides a so-called mold cavity for forming a container. Depending upon the container mold, such mold cavity is symmetrical or asymmetrical. In the case of asymmetrical molds, the two or more mold halves can be divided in such a way that their separating lines are formed at preferred locations of the subsequent container, and accordingly do not necessarily have to be divided into uniform fractions.

A blow mold for a container is typically divided into three regions: a bottom region, a center region, and a top region. A finished container typically has a container bottom, a container body, and a container shoulder. The container shoulder is the region to which a pour opening is connected. The pour opening typically has means for fastening a closure—for example, a rotary closure. The container shoulder is formed in the top region of the blow mold. During the blow-molding of the container, the container shoulder is thereby typically first inflated below the means for fastening a closure. Following the container shoulder, i.e., between the container shoulder and the container bottom, the container body is inflated. This substantially corresponds to the center region of a blow mold. The container bottom in turn forms the bottom region.

The mold construction is subject to different restrictions. On the one hand, this concerns requirements relating to the blow mold itself. For example, these have to have cooling channels, which in turn requires, for example, a minimum size of the blow mold. On the other hand, this relates to requirements that are predetermined by the later form of a container and/or by the material thereof. For example, it is possible to form sharp edges in a stretch blow-molding method only through the use of special materials such as PP or copolymer PET. Sharp edges are edges with a radius of less than 1.2 mm. As a result of contraction and shrinkage, the inflated containers are not dimensionally accurate in the region of corners and edges and can have different dimensions from batch to batch or even from container to container, since, for example, the temperatures cannot be maintained precisely in such regions, and even small differences in the material flow or in the manner and quantity of the original material have a not insignificant influence on the amount of material that ultimately comes to lie in the region of corners and edges. The smaller the desired radius, the greater this effect.

In the stretch blow-molding method, a preform is inflated in the cavity of the blow mold and is, additionally, stretched with a stretching mandrel. A wall thickness of the preform is thinner during the inflation process. When the preform is applied to the mold wall, the wall of the preform cools down, and the further inflation process of the preform can no longer take place uniformly. Typically, the first contact of the preform to be inflated is punctiform or linear. From this contact on, the material of the preform to be inflated flows differently, since the material flows at the contact point more viscously due to cooling. In other words, the material flows ever more slowly in the direction of theoretically sharp edges and becomes correspondingly ever thinner until it forms a weak point. Moreover, the material flow is also hindered by friction between the wall of the partially-inflated preform and the cavity.

However, there is a need to form containers—in particular, stretch blow-molded containers—with sharp edges as well, e.g., for better stackability or for visual reasons.

Therefore, it is the aim of the invention to overcome at least one or more disadvantages of the prior art. In particular, a blow mold with a mold base and a stretch blow molder comprising a blow mold and a method are to be provided which make it possible to form a container that is dimensionally accurate over several production cycles, is, in particular, reliably reproducible, preferably has a pleasing appearance, and, in particular, can be manufactured with precision.

This aim is achieved by the devices and methods defined in the independent claims. Further embodiments emerge from the dependent claims.

A blow mold according to the invention—in particular, a blow mold for a stretch blow-molding method—has a mold base that has a cavity as the mold cavity. The cavity has a bottom region, a center region, and a top region. When the blow mold is closed, the center region can be moved relative to the top region and/or relative to the bottom region.

This makes it possible to change the dimensions of the cavity before and/or during and/or after the blowing process. In particular, it is possible to reduce the cavity during and/or after the blowing process. Thus, an inflated container located in the cavity can already be compressed during the blowing process and/or after the blowing process. This makes it possible to counteract a thinning of the material and makes it possible to form sharp edges at the interfaces of the relative movement.

The mold base is preferably formed in multiple parts and has a top part on which the top region is formed, a center part on which the center region is formed, and a bottom part on which the bottom region is formed.

Accordingly, a container shoulder of the inflated container can be moved relative to a container body, and a compression can be carried out accordingly between the container shoulder and the container body, and a sharp edge thus be formed. In the case of a relative movability of the bottom region, a container bottom is correspondingly moved relative to the container body and a compression made between the container body and the container bottom, so that a sharp edge is produced.

Thereby, it can be provided that a sharp edge be formed both between the container body and the container bottom and between the container body and the container shoulder.

A multi-part formation of the blow mold makes it possible, on the one hand, to move the respective parts separately and independently of one another, and, on the other, to replace the respective elements easily and with little effort. If, for example, a container bottom is to obtain a new mold, it is sufficient to replace the corresponding bottom part.

It goes without saying that, for example, the center part, the bottom part, and/or the top part can each be formed in two parts, in order to enable a corresponding division of the mold along a longitudinal axis so as to form a finished container from the blow mold.

As explained further above, a multi-part division is also possible, and/or a division extends asymmetrically to the longitudinal axis.

In a preferred embodiment, the center region can be movable together with the bottom region, relative to the top region.

By means of such a formation, a compression, and thus the formation of a sharp edge, is forced only in a specific region. In the present case, a sharp edge forms between the container body and the container shoulder of the finished container.

Thereby, it can be provided that the center part and the bottom part be formed in one piece.

This enables the simple manufacture and simple movement of the bottom part together with the center part.

Alternatively, it can be provided that the center region be able to move together with the top region, relative to the bottom region.

By means of such a formation, a compression, and thus the formation of a sharp edge, is forced only in a specific region. In the present case, a sharp edge forms between the container body and the container bottom of the finished container.

Thereby, it can be provided that the center part and the top part be formed in one piece.

This enables the simple manufacture and simple movement of the top part together with the center part.

In the one-piece formation, of course, the two-part or multi-part formation of the blow mold as such is maintained, which enables the separation of the blow mold for demolding the finished container.

Preferably, the top region is arranged at least partially within the center region.

As a result, the top region can be moved, in relation to the center region, within the center region. This simplifies the compression process.

Preferably, the blow mold is formed from two mold halves.

The manufacture of the container closure is simplified. Symmetrical and, in particular, identical elements can be used for each mold half.

A further aspect of the present invention relates to a stretch blow molder comprising a blow mold as described herein.

The stretch blow molder can be fully pre-configured together with the blow mold, wherein all parameters can be coordinated with one another.

A further aspect of the present invention relates to a method—in particular, a stretch blow-molding method—for forming a container—in particular, for forming a preferably sharp edge on a container as described in the present case. The method comprises the following steps:
- introducing a preform into a cavity of a blow mold—in particular, a blow mold as described in the present case—wherein the cavity has a top region, a center region, and a bottom region,
- inflating the preform to form a container,
- relative movement of the center region to the top region and/or to the bottom region, such that the container is compressed at least in a region for forming the edge.

This method enables the formation of an especially sharp edge and prevents a container in the region of an edge from being very thin-walled and/or weakened.

By means of compression, a thinning of material is avoided, or a thinning of material is counteracted.

During the inflation of the preform to form a container, it is stretched, in particular, with a stretching rod, so that the finished container is stretched biaxially—on the one hand, in the circumferential direction by means of the inflation and, on the other, in the axial direction by means of the stretching of the preform.

Preferably, the edge is formed with a radius of less than 0.5 mm, wherein this is a preform made of PET that is inflated with a stretching of 1 to 10 through 1 to 16 and a degree of crystallization of 10% to 40%.

In a preferred form of the method, the center region is moved together with the bottom region in the direction of the top region.

As a result, a sharp edge can be formed between a container body and a container shoulder.

Alternatively, it can be provided that the center region be moved together with the top region in the direction of the bottom region.

As a result, a sharp edge can be formed between a container bottom and a container body. Such an edge can, for example, facilitate the stacking of containers because of its precision.

The method can be carried on in such a way that, after the joint movement of the center region and the bottom region, the bottom region is moved in the direction of the center region in order to form a further edge.

Accordingly, a container with two sharp edges can be formed.

Preferably, a pressure greater than 20 bar—in particular, greater than 30 bar, and preferably a pressure of approximately 40 bar—is maintained inside the container during movement.

This guarantees that a wall of the container is permanently in contact with the cavity and the inflated container, which, at this time point, is still warm and, accordingly, soft, and does not collapse or undesirably deform.

An embodiment of a blow mold according to the invention is described in more detail with reference to the following schematic figures. The following are shown.

Figure 1:
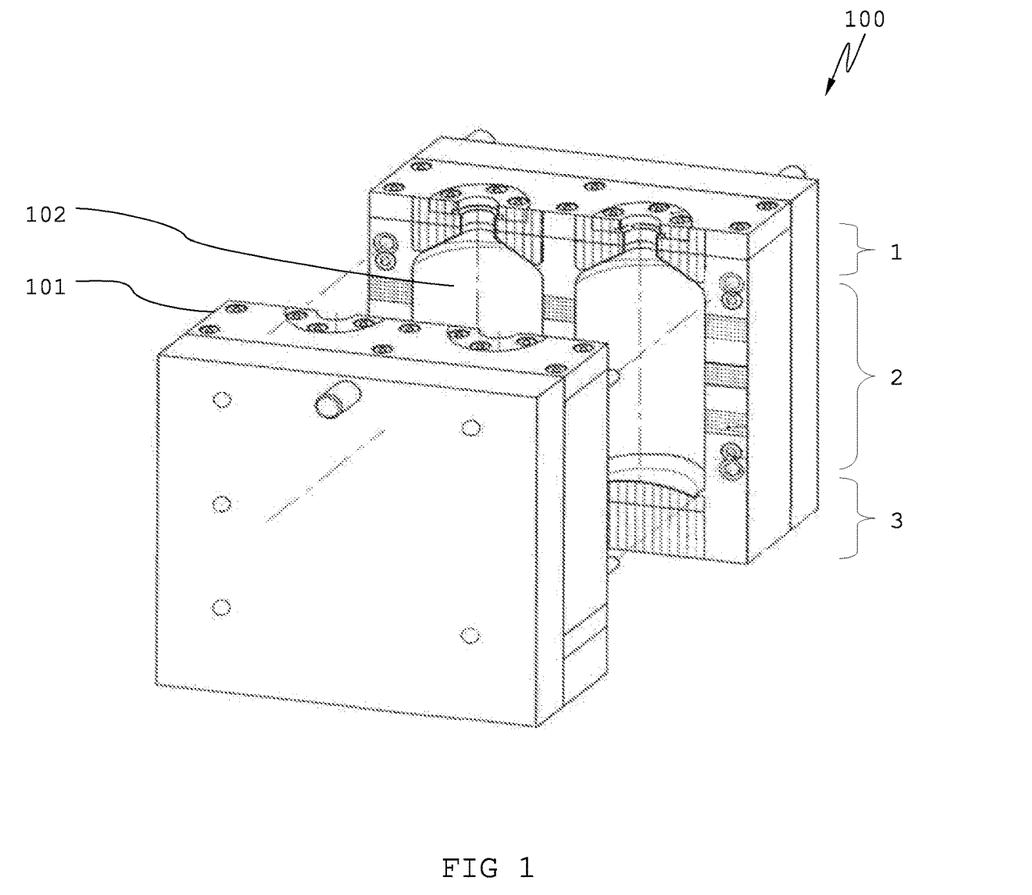
FIG. 1: a schematic structure of a blow mold.

FIG. 1 shows a schematic structure of a blow mold 100. The blow mold 100 is formed as a two-part blow mold and has a mold base 101 that is likewise formed in two parts. The blow mold 100 has two cavities 102 in the mold base 101, wherein only one of the two cavities 102 is labeled. The mold base 101 is likewise formed in two parts. In the present case, the cavities 102 are formed to inflate a bottle therein. The cavities 102 can be subdivided into three regions: a top region 1, a center region 2, and a bottom region 3.

Figure 2:
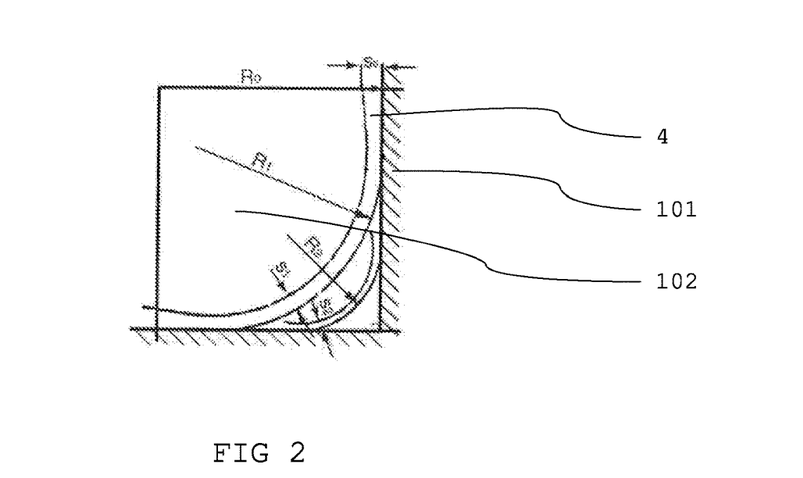
FIG. 2: a schematic illustration of a formation of an edge in the prior art.

FIG. 2 shows a schematic illustration of a formation of an edge as it is formed in the prior art. During the blowing process, a wall of the preform 4 rests against a corresponding wall of a cavity 102 of a mold base 101. In a region remote from a corner or edge to be formed, the inflated preform 4 has a wall thickness S0. The wall thickness S0 is shown in a region in which a radius R0 is infinite. In other words, the wall of the preform 4 rests completely against an inner wall of the cavity 102. By further inflating the preform 4, the material of the preform 4 is pressed in the direction of the corner. Due to the preceding cooling in the region of the infinite radius and due to friction between the wall of the preform 4 and the inner wall of the cavity 102, the material flows only to a limited extent in the direction of the corner. With the reduction in the edge radius, indicated in FIG. 2 with the radius R1, the wall thickness of the inflated preform 4 also decreases, as indicated by the wall thickness S1, which is smaller than the wall thickness S0. This aforementioned effect is further increased by further inflation. As can be seen, with a very small radius R2, the wall thickness S2 is already thin, such that a weak point later forms in the container.

Figure 3:
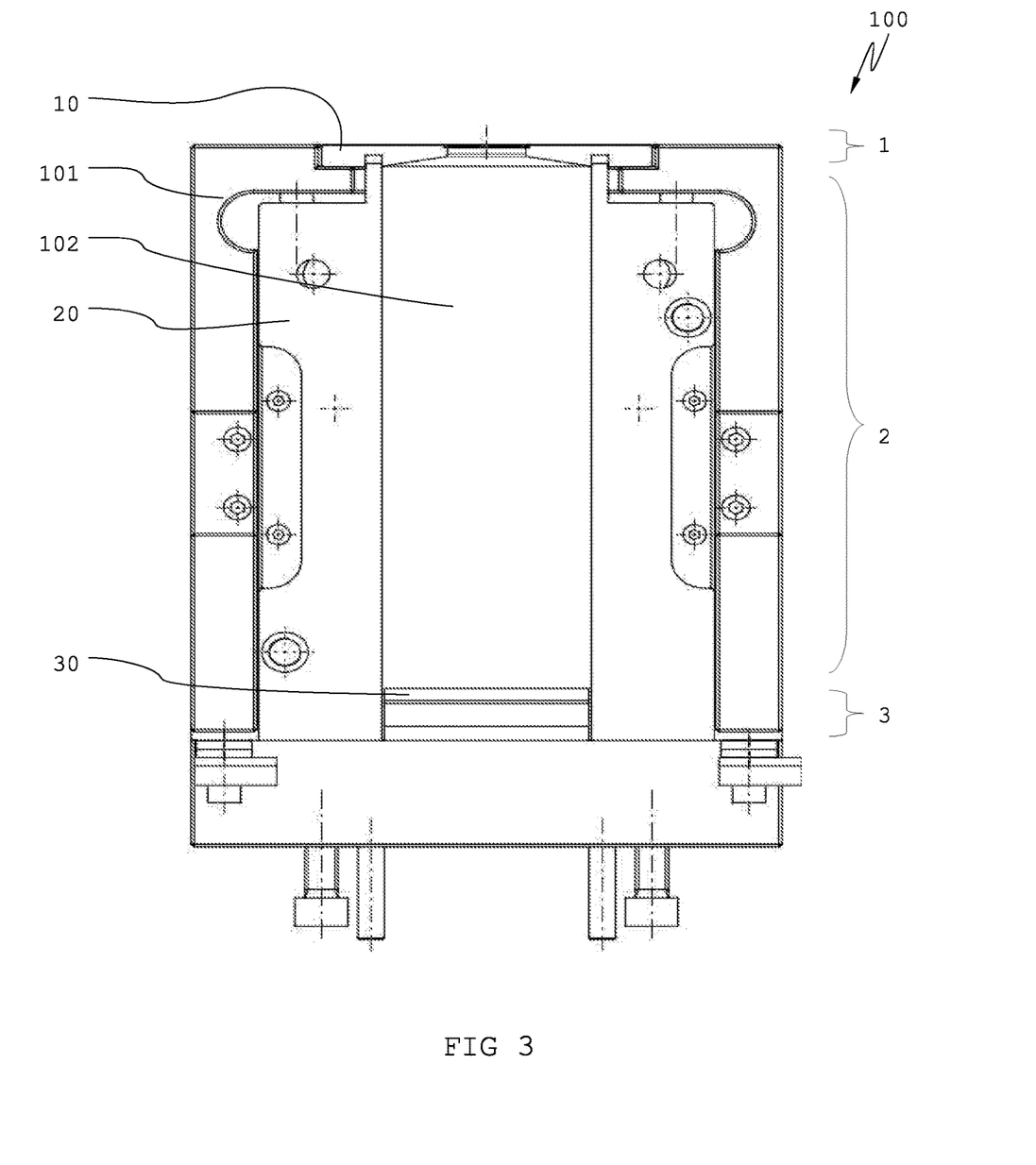
FIG. 3: a schematic illustration of a blow mold.

FIG. 3 shows a blow mold 100. The blow mold 100 has a mold base 101 in which a cavity 102 is arranged. The cavity 102 is divided into three regions: a top region 1, a center region 2, and a bottom region 3. The center region 2 is relatively movable together with the bottom region 3, in relation to the top region 1. For this purpose, in each case, the center region 2 is independently formed as a center part 20, and the bottom region 3 is independently formed as a bottom part 30. The center part 20 is formed to be movable together with the bottom part 30, relative to a top part 10, which is likewise formed separately. The top part 10 is arranged at least partially within the center part 20 and thus, in regions, slides within the center part 20.

Figure 4A:
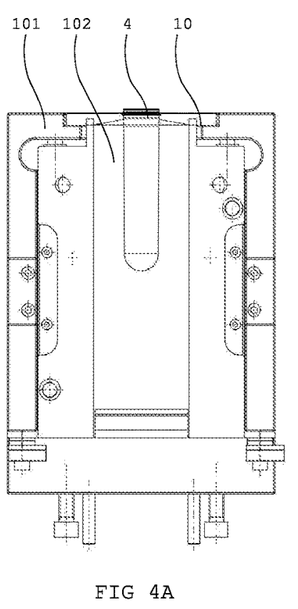
FIGS. 4A-4C: a schematic sequence of the blowing process.

FIG. 3 shows a schematic sequence of the blowing process. In a first step, which is shown in FIG. 4A, a preform 4 is introduced into the cavity 102 of a blow mold or into the cavity 102 of a mold base 101. The preform 4 is formed or interacts with a top part 10 of the blow mold in such a way that they are mutually engaged. The preform 4 was tempered accordingly before being introduced into the cavity 102. As soon as the preform 4 has been introduced into the cavity, it is stretched along its longitudinal axis with a stretching mandrel and at the same time is subjected to pressure such that the mold of the preform 4 is changed, and the latter is inflated.

Figure 4B:
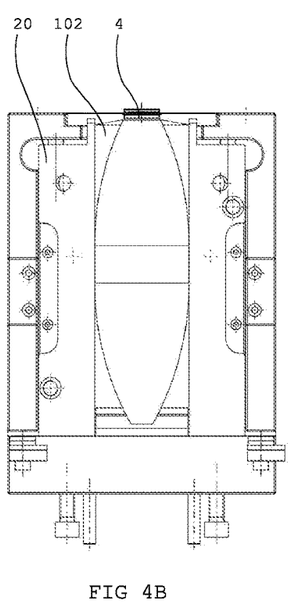

FIG. 4B shows the state in which the preform 4 has already reached its substantially complete length and is already in contact with an inner wall of the cavity 102 in a center region. In this region, the preform 4 correspondingly cools slightly, and the material adjoining such region flows correspondingly more slowly during the inflation process. As a result of further inflation, the preform 4 also comes into contact with an inner wall of the top part 10. This has the same effect as the contact of the preform 4 with the inner wall of the cavity 102 or with the inner wall of the center part 20. The material of the preform 4 cools down and is prevented from flowing in the direction of the corner to be formed. In the prior art, the blowing process would typically be interrupted at this point, so that a relatively large radius remains at the corner (compare the radius R2 in FIG. 2). In order to, nevertheless, form a sharp edge, it is therefore provided, in contrast to the prior art, that the center part 20 be moved in the direction of the top part 10 and thus the preform be compressed in the region of the corner or the edge to be formed. This process is explained in detail with reference to FIGS. 5A and 5B below.

Figure 4C:
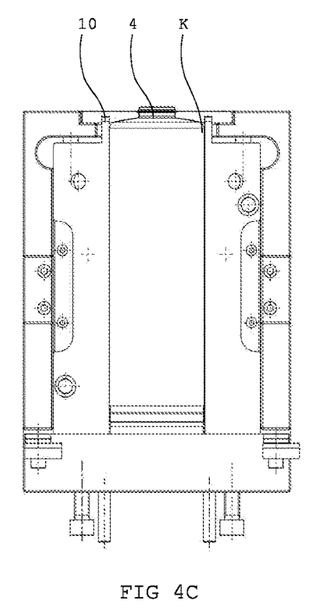
Figure 5A:
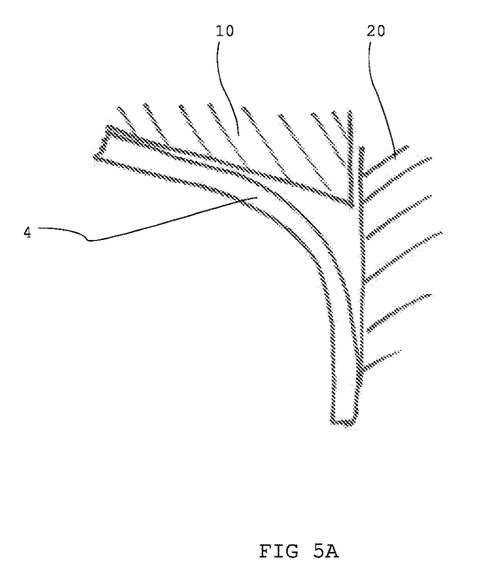
FIGS. 5A-5B: a detail view of a formation of an edge.
Figure 5B:
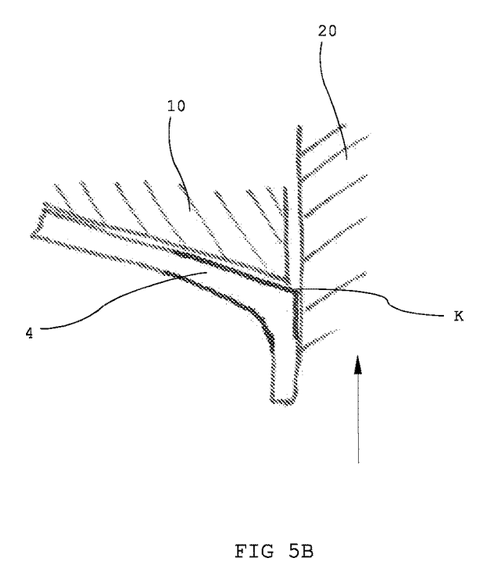

FIGS. 5A and 5B show a detailed view of a formation of an edge. FIG. 5A corresponds to the state that has already been explained according to FIG. 4C. As can already be seen from FIG. 5A, the top part 10 is decoupled in relation to the center part 20 and accordingly can be moved relative thereto, or, in the present case, the center part 20 can be moved relative to the top part 10. As soon as a wall of the preform 4 has reached a correspondingly thin wall thickness, the center part 20 is moved in the direction of the top part 10 in the direction of the arrow (see FIG. 5B). The wall of the preform 4 is thereby compressed, and an edge K forms. In the present case, the edge K is formed as a sharp edge K with a radius of less than 0.5 mm. It can also be seen from FIG. 5B that the wall thickness of the preform 4 is formed to be correspondingly thicker in the region of the edge K, and thus has increased stability in the region of such edge.

Figure 6:
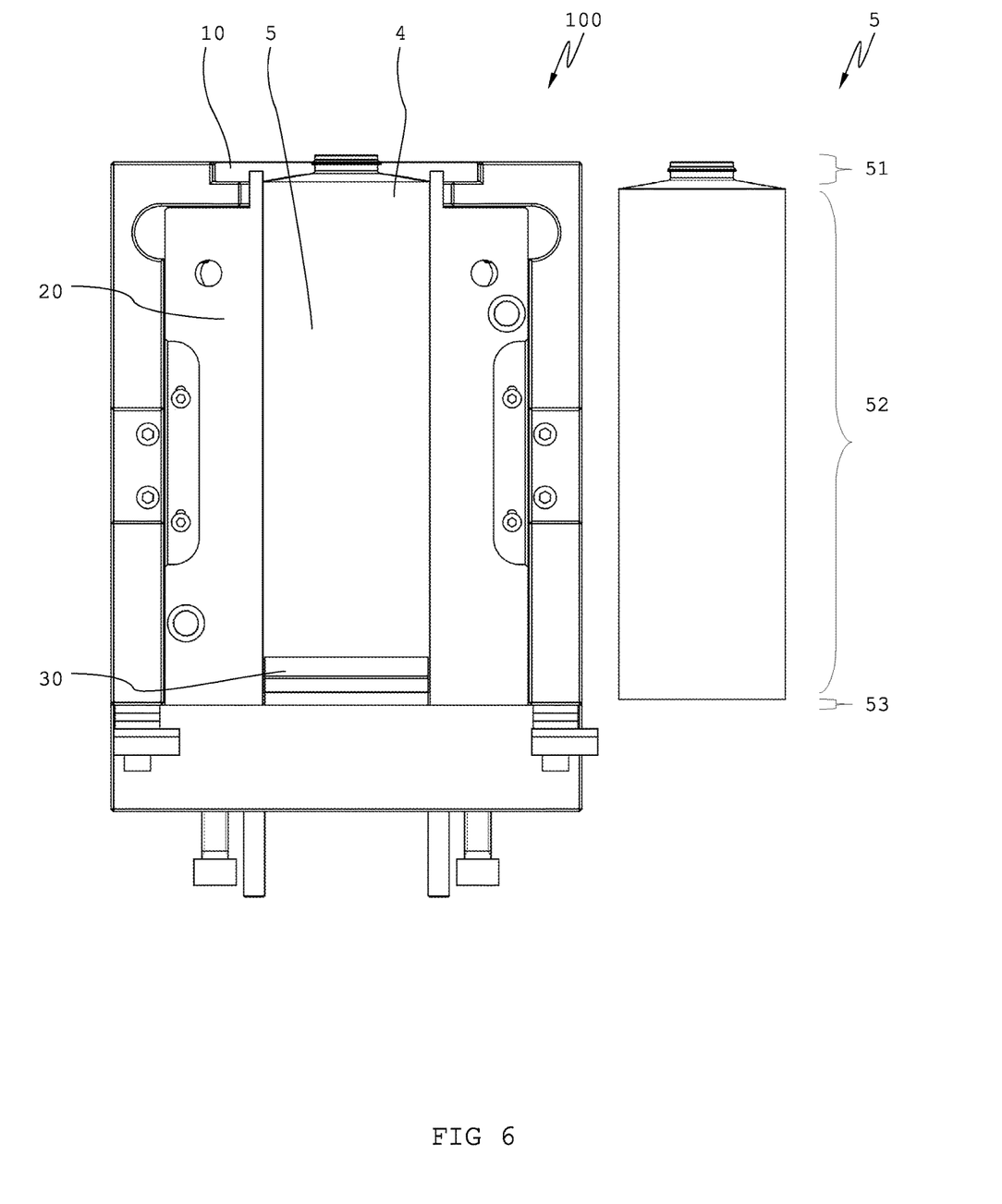
FIG. 6: the blow mold and a formed container after the formation of an edge.

FIG. 6 shows the blow mold 100 and a formed container after the formation of an edge. The final position of the blow mold 100 is shown in FIG. 6. The preform 4 is completely inflated and is formed into a container 5. The center part 20 has been moved in the direction of the top part 10, and a sharp edge has been formed between a container shoulder 51 and a container body 52. In addition, a bottom part 30 has likewise been moved in the direction of the top part 10, and thus a sharp edge as well has been formed between the container body 52 and a container bottom 53. In the present case, the container bottom 53 has practically no axial extension any more.

It is understood that the present description of figures shows the view of an open blow mold 100 in each case. In other words, one half of the blow mold 100 is shown in each case. All embodiments apply analogously to the second half of this two-part blow mold 100.

The invention claimed is:

1. A blow mold with a mold base having a cavity as the mold cavity, wherein the cavity has a bottom region, a center region, a top region, and a longitudinal axis extending vertically from the bottom region to the top region wherein, when the blow mold is closed, the center region can be moved along the longitudinal axis relative to the top region and/or relative to the bottom region.

2. The blow mold according to claim 1, wherein the mold base is formed in multiple parts and has a top part on which the top region is formed, and a center part on which the center region is formed, and a bottom part on which the bottom region is formed.

3. The blow mold according to claim 1, wherein the center region together with the bottom region can be moved relative to the top region.

4. The blow mold according to claim 3, wherein the center part and the bottom part are formed in one piece.

5. The blow mold according to claim 1, wherein the center region together with the top region can be moved relative to the bottom region.

6. The blow mold according to claim 5, wherein the center part and the top part are formed in one piece.

7. The blow mold according to claim 1, wherein the top region is arranged at least partially within the center region.

8. The blow mold according to claim 1, wherein the blow mold is formed from two mold halves.

9. A stretch blow molder comprising a blow mold according to claim 1.

10. A method for forming a container having an edge, wherein the method has the following steps:
introducing a preform into a cavity of a blow mold wherein the cavity has a top region, a center region, a bottom region, and a longitudinal axis extending vertically from the bottom region to the top region;
inflating the preform to form a container; and
moving the center region along the longitudinal axis in relation to the top region and/or to the bottom region, such that the container is compressed at least in a region for forming the edge.

11. The method according to claim 10, wherein the edge is formed with a radius of less than 0.5 mm.

12. The method according to claim 10, wherein the center region together with the bottom region is moved in the direction of the top region.

13. The method according to claim 10, wherein the center region together with the top region is moved in the direction of the bottom region.

14. The method according to claim 13, wherein, after the joint movement of the center region and the bottom region, the bottom region is moved in the direction of the center region in order to form a further edge.

15. The method according to claim 10, wherein a pressure greater than 20 bar is maintained inside the container during movement.

16. The method according to claim 15 wherein a pressure greater than 30 bar is maintained inside the container during movement.

17. The method according to claim 15 wherein a pressure greater than 40 bar is maintained inside the container during movement.

* * * * *